(12) United States Patent
Weschler

(10) Patent No.: US 6,842,903 B1
(45) Date of Patent: Jan. 11, 2005

(54) SYSTEM AND METHOD FOR PROVIDING DYNAMIC REFERENCES BETWEEN SERVICES IN A COMPUTER SYSTEM

(75) Inventor: Paul Weschler, Broomfield, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/314,644

(22) Filed: May 19, 1999

(51) Int. Cl.$^7$ ............................................. G06F 9/00
(52) U.S. Cl. ...................... 719/328; 717/162; 717/167
(58) Field of Search .................. 709/20–253, 310–317, 709/328; 707/1–10; 717/162–167; 719/327–332

(56) References Cited

U.S. PATENT DOCUMENTS

| | | | | |
|---|---|---|---|---|
| 5,339,430 A | * | 8/1994 | Lundin et al. | 709/332 |
| 5,832,506 A | | 11/1998 | Kuzma | 707/200 |
| 5,872,966 A | * | 2/1999 | Burg | 709/313 |
| 6,006,279 A | * | 12/1999 | Hayes | 719/328 |
| 6,026,404 A | * | 2/2000 | Adunuthula et al. | 707/10 |
| 6,304,967 B1 | * | 10/2001 | Braddy | 713/150 |
| 6,360,230 B1 | * | 3/2002 | Chan et al. | 707/103 |
| 6,366,916 B1 | * | 4/2002 | Baer et al. | 707/10 |
| 6,553,413 B1 | * | 4/2003 | Leighton et al. | 709/219 |
| 6,633,923 B1 | * | 10/2003 | Kukura et al. | 719/316 |
| 2003/0120597 A1 | * | 6/2003 | Drummond et al. | 705/43 |

FOREIGN PATENT DOCUMENTS

GB 2347766 A * 9/2000 ............. G06F/3/12

OTHER PUBLICATIONS

Article Lightweight Directory Access Protcol (v3), by M. Wahl et al., Dec. 1997.
Article "Lightweight Directory Access Protocol (v3) Extensions for Dynamic Directory Services" By Y. Yaacovi et al., May 1999.

"The Value of Corporate Services Automation in the Enterprise," White Paper, Oblix, Inc., Oct. 1998.

"Solutions and Products," *The Oblix CSA Solution™*, Oblix Website, 1998.

Untitled, Zoomit Website, Jan. 21, 1999.

"Synchronicity for NT Product Brochure," NetVision Website, 1997.

* cited by examiner

*Primary Examiner*—Meng-Al T. An
*Assistant Examiner*—Charles Anya
(74) *Attorney, Agent, or Firm*—William J. Kubida; Kent A. Lembke; Hogan & Hartson LLP

(57) ABSTRACT

A system and method for providing dynamic references between services in a computer system which allows a first service (e.g. an application program running on a client computer in a local environment) to gain reference to a second service (e.g. a service running on a server computer in a distributed environment) without requiring knowledge of how to find the service or a particular version of the service on a distributed computer network. In a particular embodiment disclosed, when a getService method is called, a reference back to an instance of the service is returned and an implementation of a service connector interface encapsulates the logic necessary to lookup an instance of a specific service and return a reference to that service. In this regard, developers of a service may write, or program, a module that adheres to a service connector interface. Users of a service specify that the service connector provided by the service can be used to dynamically gain a reference to the service in their application. Additional methods can be added to the service connectors to support retrieval of references to specific versions or instances of a service.

17 Claims, 3 Drawing Sheets

Application Config File

SYSTEM AND METHOD FOR PROVIDING DYNAMIC REFERENCES BETWEEN SERVICES IN A COMPUTER SYSTEM

BACKGROUND OF THE INVENTION

The present invention relates, in general, to the field of computer systems and methods for implementing the same. More particularly, the present invention relates to a system and method for providing dynamic references between services in a computer system.

Computer systems including business systems, entertainment systems, and personal communication systems are increasingly implemented as distributed software systems. These systems ate alternatively referred to as "enterprise networks" and "enterprise computing systems". These systems include application code and data that are distributed among a variety of data structures, data processor systems, storage devices and physical locations. They are intended to serve a geographically diverse and mobile set of users. This environment is complicated because system users move about the distributed system, using different software applications to access and process data, different hardware to perform their work, and often different physical locations to work from. These trends create a difficult problem in providing a secure yet consistent environment for the users.

In general, distributed computing systems must scale well. This means that the system architecture desirably adapts to more users, more applications, more data, and more geographical distribution of the users, applications, and data. The cost in money and time to switch over a network architecture that is adapted to a smaller business to one suited for a larger business is often prohibitive.

A conventional computing system uses a client/server model implemented on a local area network ("LAN"). In such systems powerful server computers (e.g., application servers and file servers) are used to process and access data. The requested data is then transmitted to the client computer for further processing. To scale to larger networks, multiple LANs may be inter-networked using, for example, leased data lines to create a wide area network ("WAN"). The equipment required to implement a WAN is expensive and difficult to administer. Also, as networks become larger to include multiple LANs and multiple servers on each LAN it becomes increasingly difficult to find resources (i.e., files, applications, and users) on any one of the LANs.

As computing power continues to become less expensive, clients tend to process and store their own data, using the server primarily as file servers for sharing data with other client computers. However, software applications are increasingly implemented as distributed applications in which parts of the application code reside on different computers. An example of this is a conventional world wide web browser program in which various "plug-in" components are provided after program installation to perform specific tasks. Another example is the Java™ programming environment in which applications or "applets" are downloaded dynamically for execution on a client machine. Hence, even though client machines are increasingly used to execute program code, there is an increasing need to know the location of network resources from which code can be obtained.

Peer-to-peer type networks are an evolutionary change to client/server systems. In a peer-to-peer network each computer on the LAN/WAN can act as a server for applications or data stored on that machine. A peer-to-peer network does not require, but is able to, run alongside a client/server system. Peer-to-peer architectures offer a potential of reduced complexity by eliminating the server and efficient use of resources available in modern client and workstation class computers. However, peer-to-peer networks remain dependent on a secure, closed network connection to implement the LAN/WAN which is difficult to scale upwardly. Peer-to-peer solutions also do not scale well because as the network becomes larger it becomes increasingly difficult to identify which peer contains the applications and data needed by another peer. A need exists for a system and method that enables a peer-to-peer architecture to scale without reduced performance, ease of use, and security.

Another complicating influence is that networks are becoming increasingly heterogeneous on many fronts. Network users, software, hardware, and geographic boundaries are continuously changing and becoming more varied. For example, a single computer may have multiple users, each of which work more efficiently if the computer is configured to meet their needs. Conversely, a single user may access a network using multiple devices such as a workstation, a mobile computer, a handheld computer, or a data appliance such as a cellular phone or the like. A user may, for example, use a full featured e-mail application to access e-mail while working from a workstation but prefer a more compact application to access the same data when using a handheld computer or cellular phone. In each case, the network desirably adapts to the changed conditions with minimal user intervention.

In order to support and enterprise computing system, the client/server or peer-to-peer network had to provide a standard mechanism to establish data communication links between software applications on the same computer or other computers in a distributed system. There is increasing interest in remote access systems that enable a user to access a LAN/WAN using a public, generally insecure, communication channels such as the Internet. Further, there is interest in enabling LANs to be inter-networked using public communication channels. In an enterprise system it is critical that these distributed resources remain available. A disabled, slow, or unreliable link to a distributed resource can affect performance of the entire system. However, to make a reliable connection, an application must first discover to location an entry points of the resource it needs to use. Accordingly, the need for a mechanism and system to dynamically make connections to distributed services is needed.

From a network user's perspective these limitations boil down to a need automatically and dynamically gain a reference to a service running on the network without a need for the user to manually locate the service instance on the network. Further, a need exists for a mechanism to automatically identify the entry points of a service on the network without requiring the user to have a priori knowledge of the network service's interface parameters. What is needed is a system that readily adapts to a changing, heterogeneous needs of a distributed network computing environment.

One solution to the problem of finding resources in a distributed system is to use directories. Directories are data structures that hold information such as mail address book information, printer locations, public key infrastructure ("PKI") information, and the like. Meta-directories are a solution that provides directory integration to unify and centrally manage disparate directories within an enterprise. However, directory and meta-directory solutions only help to catalog information that is already known and do not provide a mechanism for automatically discovering the identity and interface parameters for a network service.

In such a distributed computing environment, it has heretofore been extremely difficult for an application program running on a given service (e.g. a client computer in a local environment) to locate and use a needed service (e.g. on a remotely located server computer) without having to embed all of the logic in the application necessary for finding the service or negotiating for a given version of the service that is ultimately desired.

SUMMARY OF THE INVENTION

The system and method of the present invention advantageously provides a generic mechanism for a service to dynamically gain a reference to another service without requiring knowledge of how to find the service or a particular version of the service on a distributed computer network.

The system and method of the present invention defines a module interface for "Service Connectors". The interface supports the following fundamental methods:

getService( )

getServiceIdentifier( )

getServiceInterface( )

When the getService method is called, a reference back to an instance of the service is returned and the implementation of the "Service Connector" interface encapsulates the logic necessary to lookup an instance of a specific service and return a reference to that service. The system an method disclosed herein may be used in distributed environments to hide the logic necessary to perform the lookup and create the reference.

In this regard, developers of a service may write, or program, a module that adheres to the "Service Connector" interface. Users of a service specify that the "Service Connector" provided by the service can be used to dynamically gain a reference to the service in their application. When the application needs to bind to and use the service, the service connector is invoked and the getService method called.

In particular implementations of the present invention, additional methods can be added to the Service Connectors to support retrieval of references to specific versions or instances of a service. The getServiceIdentifier( ) and getServiceInterface( ) methods serve to provide descriptive information about the service for which a given service connector is designed to connect.

Particularly disclosed herein is a method and computer program product providing for implementation of a method for allowing a first service to gain reference to a second service in a computer system. The method comprises the steps of defining a service connector interface in conjunction with the first service, invoking the service connector interface in conjunction with the second service and gaining reference to the first service by the second service.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

In general the present invention involves an architecture that employs a lightweight service application (e.g., core profile engine 201 in FIG. 2) that provides multiple "pluggable" interfaces for runtime extensibility. The core profile engine provides essential functionality and may provide built-in (i.e., non-pluggable) interfaces as well to provide built-in functionality upon instantiation. Plug-in components are provided with the core profile engine or by third-party component manufacturers to implement functionality and program behavior that is not included in the built in "essential" functions.

The pluggable interfaces support connections to plug-in services that implement behavior and functionality not provided in the core application. The present invention particularly involves a mechanism to dynamically gain access to compatible plug-in features by determining a reference to the service and determining interface parameters for the service. This is performed in a manner that does not require the core application to have a priori knowledge about how to find the service or any information about a particular version of the service. The plug-ins may be stored locally (i.e. on the same computer system as the core application) or remotely on any resource accessible to the core application via a data communication link.

In the particular implementation disclosed herein, plug-in behavior is of three general types. First, plug-in protocol adapters manage communication with user entities such as people, software applications, and hardware devices that make access requests to obtain information from the profile system. Second, plug-in service provider interfaces implement access protocols for data storage mechanisms including naming and directory services for data storage mechanisms. Thirdly, service module plug-ins are attached at runtime to provide functionality and behavior that augments the program behavior implemented in the core application. In this manner, the core application is readily extended to provide new functionality, using new hardware devices and network configurations to provide service to new types of clients.

Figure 1:
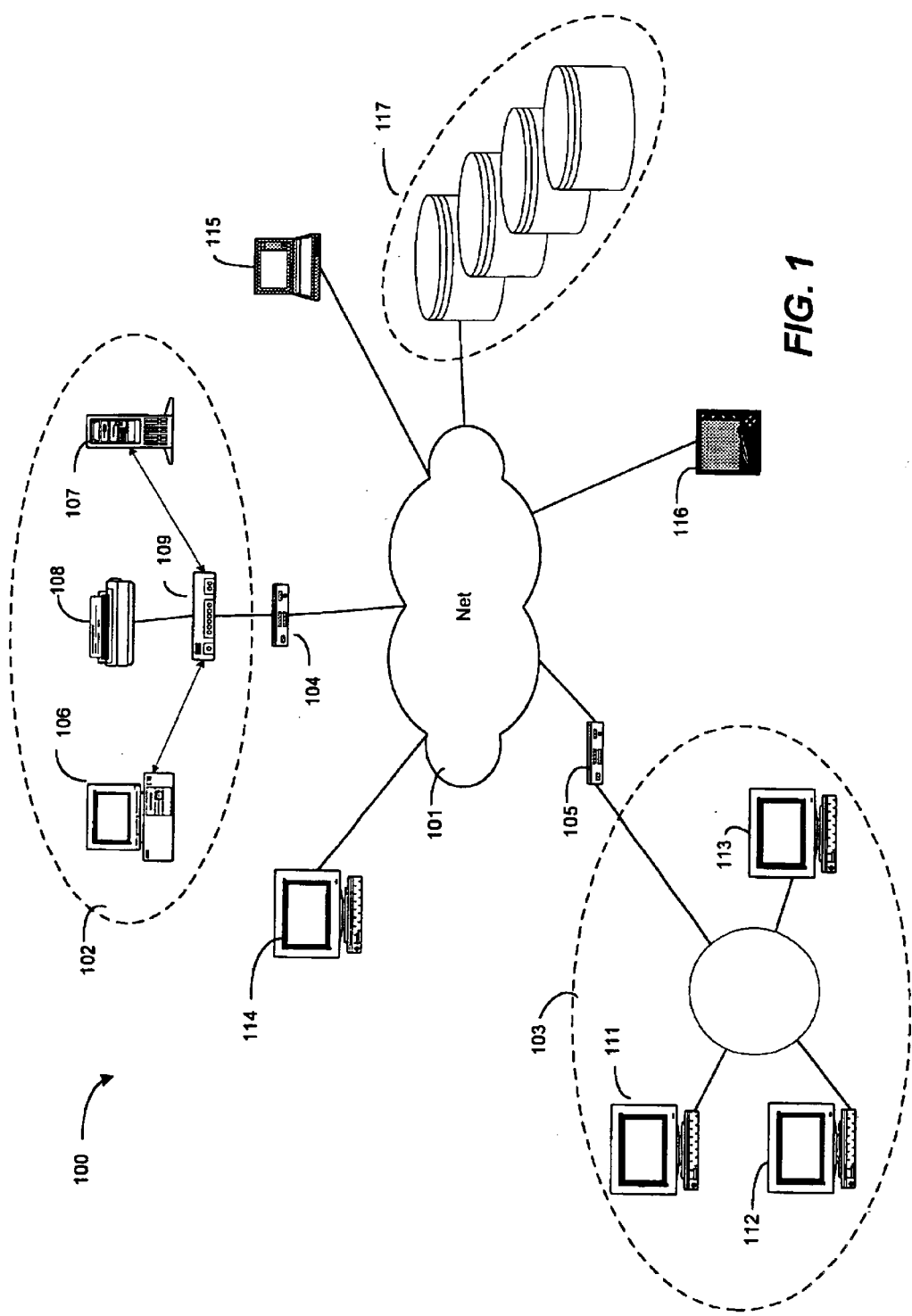
FIG. 1 illustrates a representational network computing system and operating environment for performing the computer implemented steps of a method in accordance with the present invention.

With reference now to FIG. 1, the present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments as well as small network environments such as conventional local area network ("LAN") systems.

It is contemplated that the present invention will be particularly useful in environments that require a data structure that is quickly searched and where the data is suited to a hierarchical representation. Also, the system of the preferred implementation is designed to store and make available relatively compact units of data that serve to configure devices and computer environments rather than operational or analytical data upon which the computer environment may operate at runtime. Hence, the present invention is best used when it stores and retrieves data that is frequently searched and retrieved, but infrequently changed.

FIG. 1 shows an exemplary computing environment 100 in which the present invention may be implemented. Essentially, a number of computing devices and groups of devices are interconnected through a network 101. For example, a LAN 102 and a LAN 103 are each coupled to network 101 through gateway machines 104 and 105 respectively. LANs 102 and 103 may be implemented using any available topology such as a hub and spoke topology of LAN 102 and a loop topology of LAN 103. LANs 102 and 103 may implement one or more server technologies including, for example a UNIX, Novell, or Windows NT, or peer-to-peer type network. Each network will include distributed storage implemented in each device and typically includes some mass storage device coupled to or managed by a server computer. Network 101 comprises, for example, a public network such as the internet or another network mechanism such as a fibre channel fabric or conventional wide area network ("WAN") technologies.

LAN 102 includes one or more workstations such as personal computer ("PC") 106. LAN 102 also includes a server machine 107 and one or more shared devices such as printer 108. A hub or router 109 provides a physical connection between the various devices in LAN 102. Router 104 is coupled through gateway 109 to provide shared access to network 101. Gateway 109 may implement any desired access and security protocols to manage access between network 101 and devices coupled to network 102. Similarly, network 103 comprises a collection of workstations 111, 112 and 113 that share a common connection to network 101 through gateway 105.

Distributed computing environment 100 further includes a wide variety of devices that have a logical connection to the network supported by a physical connection to network 101. For example, a stand alone workstation 114 may couple to network 101 through a modem or other suitable physical connection. Likewise, notebook computer 115 and palmtop computer 116 may connect to network 101 using known connection technologies. It is contemplated that a wide variety of devices may join the distributed network 100 including mobile phones, remote telemetry devices, information appliances, and the like. An important feature of the present invention is that it tolerates and adapts to an environment filled with heterogeneous hardware devices coupled to the network 101 from a variety of physical locations.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 116 that provides mass storage capacity beyond what an individual device can efficiently use and manage. Selected components of the present invention may be stored in or implemented in shared mass storage such as disk farm 116.

The computer program product devices in accordance with the present invention include elements that operate in a server, a client or both. It is contemplated that elements may be stored remotely, delivered to a client system on demand by a server computer and executed partially and completely by the server and client. Accordingly, the present invention is not limited by the method of distribution or packaging that a particular application involves. In other words, the present invention may be distributed as client-only software devices, server-only software devices or as system software that is distributed to both client and server devices.

Figure 2:
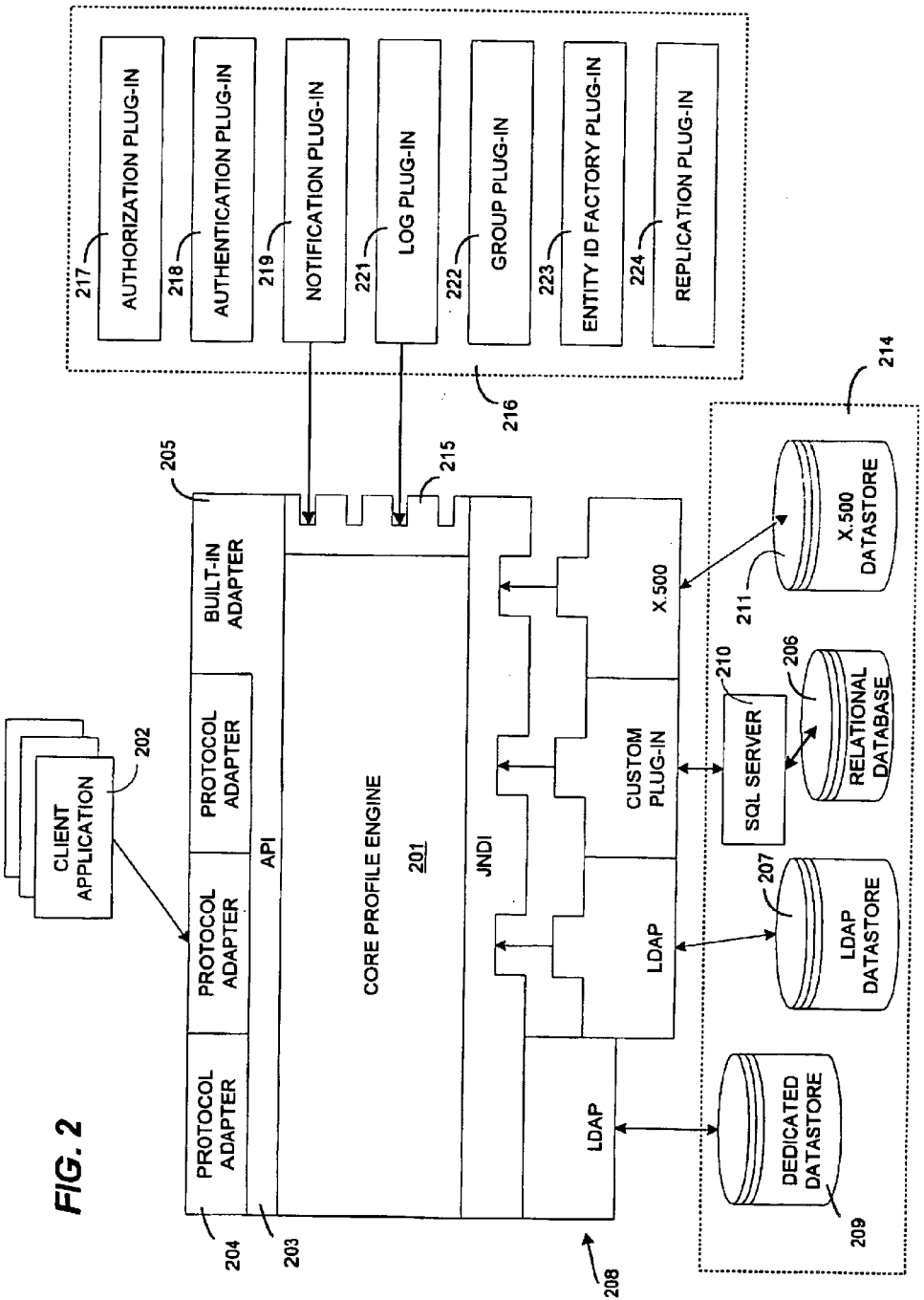
FIG. 2 illustrates a more specific network architecture in which in which the present invention may be employed.

With reference additionally now to FIG. 2, a more specific example of the present invention implemented in a gateway or firewall server such as gateway 104 or gateway 105 in FIG. 1 is shown. The components implemented in a gateway machine include a core profile engine 201 that is accessed by a client application 202 through a profile services application programming interface ("API") 203. API 203 provides an interface that enables client applications that have a corresponding interface to send messages that enable the application to send data and commands to request profile services from core profile engine 201.

In the particular implementation core profile engine 201 provides a limited set of basic functions (methods) including "factory" methods for creating profiles, search and retrieve methods for accessing existing profiles, and management utilities for defining schemas. To this basic set of core functionality, core profile engine 201 also supports methods for gaining a reference to plug-in services (e.g., adapters 204, service adapters 216, and data store adapters 208) that can add any variety of behavior and functionality to the application functions.

Although the present invention is illustrated in terms of a profile service accessing a variety of plug-in service modules, it should be understood that any functionality, including a variety of widely disparate services, could be implemented by an application substituted for core profile engine 201. For example, core profile engine 201 might implement a web browser functionality and support various pluggable interfaces for adding specific functions for multimedia content, database searching, and the like. The specific examples herein are not to be construed as limitations on the basic teachings of the present invention unless expressly indicated.

API 203 implements within itself or attaches to one or more protocol adapters 204. Client applications 202 that have a corresponding interface to one of protocol adapters 204 send and receive messages through API 203 to core profile engine 201. The messages enable client application (s) 202 to send data and commands to request profile services from core profile engine 201.

In a particular implementation the profile service API 203 includes a built in protocol adapter 205 to provide client accessibility without any plug-in adapters 204. In a particular embodiment, built-in adapter 205 implements a protocol based on extensible markup language documents embedded within hypertext transport protocol ("HTTP") data packets. The XML documents have embedded elements that contain formatted versions of request and response messages communicated between client application(s) 202 and core profile engine 201. XML documents are a useful format because the language is well understood, actively developed, and readily transportable through a variety of communications media using commonly available HTTP transport mechanisms. Routers, switches, network ports, and other network devices recognize XML formatted documents embedded in HTTP data transport packets and are configured to handle them appropriately and reliably. It is contemplated that other formats and transport mechanisms may be used such as HTML or SGML format documents. Also, other transport mechanisms may be useful in particular applications such as transport mechanisms specified for fibre channel fabrics as well as proprietary transport protocols. These and other implementations are considered equivalent to the specific embodiments disclosed herein unless specifically indicated otherwise.

Core profile engine 201 responds to the client request messages by passing the message to an appropriate method to execute requested functions on virtual profile data store 214. Core profile engine 201 may comprises a profile manager object and a plurality of profile objects. Typically the core profile service will respond to a request message by accessing profile information from its dedicated datastore or an external datastore (shown in FIG. 2) and generating a response message. The response message is sent back through API 203 to the appropriate protocol adapter 204 (or built-in adapter 205) to the requesting client application 202.

In the implementation of FIG. 2, core profiling engine 201 includes a built-in interface for attaching to data storage devices. Java™ Naming and Directory Interface™ ("JNDI") is a commercially available naming and directory interface that includes a pluggable service provider interface ("SPIs") and although the exemplary embodiment disclosed herein is described with respect to JNDI, other similar products may likewise be employed. JNDI is essentially an API that provides naming and directory functionality to applications written in a Java programming environment. Java and Java Naming and Directory Interface are trademarks or registered trademarks of Sun Microsystems, Inc in the United States and other countries. JNDI is defined to be independent of any specific directory service implementation. Hence, a variety of directories including legacy, emerging, and already deployed directories can be accessed in a common manner. In operation core profile engine 201 causes JNDI to create a transparent runtime binding to naming and directory service such as an X.500 or LDAP datastore as shown in FIG. 2.

It is contemplated that instead of or in addition to JNDI the present invention may also incorporate a built-in interface to support directory access to its associated dedicated datastore 209. Because dedicated datastore 209 is not accessed by other applications, a compiled, built-in interface may be more appropriate and efficient than a plug-in interface. In the example of FIG. 2, built-in LDAP module 208 is used to access dedicated datastore 209. However, the JNDI layer provides flexibility in the choice of the mechanism used to implement dedicated data store 209 as the LDAP module 206 is readily replaced by any of a wide variety of available modules.

Virtual profile data store 214 may comprise a single data storage device, but more often comprises a plurality of disparate, heterogeneous data storage devices. The specific example of FIG. 2 includes an LDAP datastore 207, X.500 datastore, and a relational database accessed through a database application 210 such as a structured query language ("SQL") server. As noted above, virtual profile data store 214 may also include flat data file(s), object oriented database(s) and the like. Virtual data store 214 includes a dynamically changing number of data store devices as datastore mechanisms can be added, changed, modified and deleted by modifications to the associated adapter module.

The core profiling engine 201 includes another pluggable interface 215 for attaching to one or more optional pluggable service modules such as modules 217–224, that provide supporting functionality and implement program behavior. The set of plug in service modules 216 are optional in that core profile engine 201 will run even if no plug-in modules are available. Modules are plugged in by specifying an initialization parameter when the profile manager object within core profile service 201 is instantiated. The initialization parameter comprises an address or fully qualified path pointing to a location at which the plug-in module is stored. The plug-in module need not be stored locally or in the same machine as the core profile engine 201. Upon instantiation, core profile engine 201 creates a runtime binding to the plug-in service module and thereafter the program behavior embodied in the plug-in module is available. While plug-in service modules will typically extend functionality of core profiling service 201, it is contemplated that in some applications a plug-in module may override or overload basic functionality and behavior implemented as built-in functions within core profile service 201. In this manner the core profiling engine can be customized and extended to meet the needs of a particular application.

Example plug-in service modules shown in FIG. 2 include authorization module 217 and authentication module 218 that implement authentication and authorization for a particular application. Some implementations may not need this service and so it is not integrated into core profile engine 201. Also, the complexity of these features will vary significantly in response to the needs of a particular application. These modules combine with core profiling service 201 to provide enterprise level functionality and are fully optional.

Figure 3A:
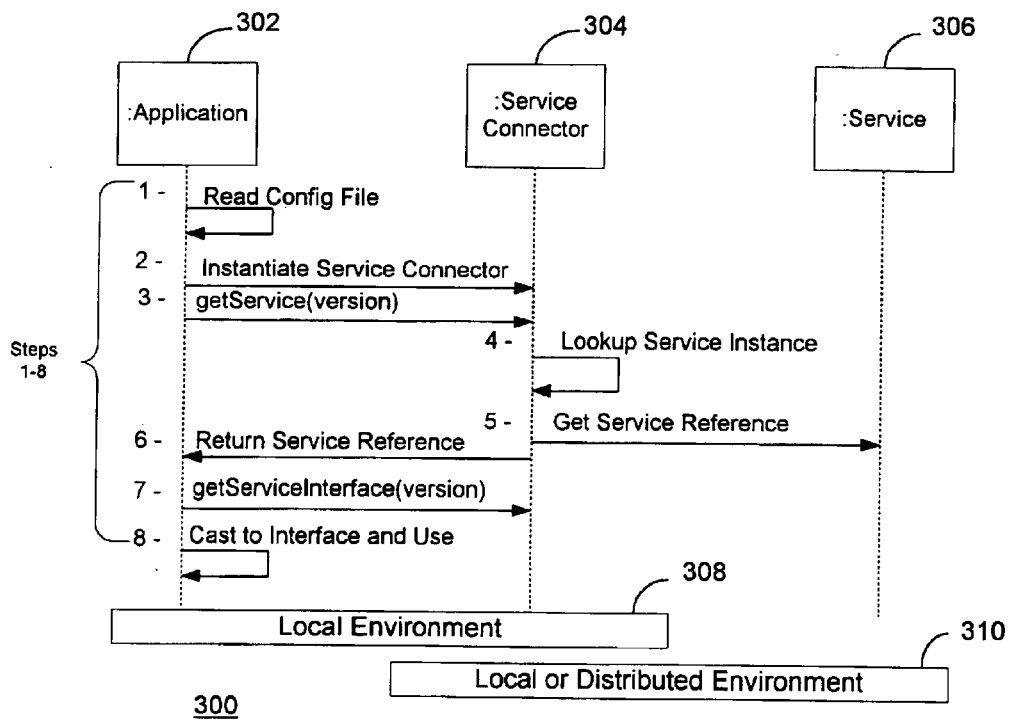
FIG. 3A illustrates an exemplary application of a service connector (or service adapter) in accordance with the present invention, which may be provided by the service implementor and made available to the associated application, for providing dynamic references between services in a computer system.
Figure 3B:
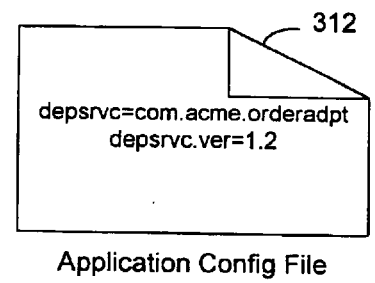
FIG. 3B is simplified representation of an associated application configuration file having parameters specified by the service implementation.

With reference additionally now to FIGS. 3A and 3B an exemplary implementation 300 of a service connector (or service adapter) for providing dynamic references between services in a computer system is shown. In each pluggable interface shown in FIG. 2, the present invention provides a mechanism for gaining access to the plug-ins. The present invention is specifically described in terms of gaining references to service module plug-ins 216, although the techniques are readily extended to other plug-in modules. An application program 302 running on a given service (for example, a client computer) and service 306 (for example, running on a server computer) are dynamically coupled by means of a service connector 304 with the application 302 and service connector 304 being possibly part of the same local environment 308. In like manner the service connector 304 and service 306 may be part of a local or distributed environment 310 as illustrated.

In the representative illustration shown, an application program running on a service in a local environment 308 has need of utilizing a service running in either the same local or distributed (i.e. remote) environment 310. In effectuating this in accordance with the system and method of the present invention, the service connector 304 provides a mechanism through which the application 302 (e.g. the client) can obtain a reference to the service 306 (e.g. the server) and use it. The service 306 creator provides the service connector 304 and it adheres to a specific application program interface ("API"). In the exemplary implementation shown, the fundamental method utilized is denominated "getService" and invoking it returns a reference to the actual service 306 that the application 302 requires. The service connector 304 is, therefore, provided to any application 302 which requires connection to the service 306. The service connector 304 may be compiled along with the application 302 or otherwise made available to it through installation in the local environment 308.

Upon start-up, the application 302 first reads a configuration file at step 1. An exemplary configuration file 312 in JAVA is shown in FIG. 3B as (depsrvc=com.acme.orderadpt with depsrvc,ver=1.2). This provides an indicator to the application 302 such that at step 2, the application 302 can instantiate the service connector 304. Thereafter, at step 3, the getService(version) method is called and the service adapter 304 performs a lookup of the service instance at step 4. The getService(version) is utilized to specify the particular version of the service 306 that the application 302 desires. It should be noted that there can be multiple versions of the service instance of service 306 and, in the absence of specifying a particular version through the getService (version) methodology, the default may be set to provide the latest version of the service 306 to the application 302. Because the service 306 provider also provides and programs the service connector 304, the protocol for effectuating this is set at that time.

The service connector 304 performs a getService reference to the service 306 at step 5 and the service adapter 304 returns the service reference to the application 302 at step 6. At step 7, the application may issue a getServiceInterface (version) method to the service adapter 304 to get information on what interface the Service Reference returned at step 6 implements. Finally, the application 302 casts to the interface and begins utilization of the service 306 at step 8.

As can be appreciated, the application 302 is only initially invoking the service connector 304 and not the service 306. It is the service connector 304 which provides the reference to the service 306 that enables the application 302 to use it. Through the use of the service adapter 306, it is not necessary to embed all of the logic necessary for the application 302 to determine how to get a reference directly to the service 306.

The system and method of the present invention advantageously provides a generic mechanism for a service to dynamically gain a reference to another service without requiring knowledge of how to find the service or a particular version of the service on a distributed computer network.

The system and method of the present invention defines a module interface for "Service Connectors" which supports the following fundamental methods:

getService( )
getServiceIdentifier( )
getServiceInterface( )

When the getService method is called, a reference back to an instance of the service is returned and the implementation of the service Connector interface encapsulates the logic necessary to lookup an instance of a specific service and return a reference to that service. The system and method disclosed herein may be used in distributed environments to hide the logic necessary to perform the lookup and create the reference.

In this regard, developers of a service may write, or program, a module that adheres to the service connector interface. Users of a service specify that the service connector provided by the service can be used to dynamically gain a reference to the service in their application. When the application needs to bind to and use the service, the service connector is invoked and the getService method called.

In particular implementations of the present invention, additional methods can be added to the service connectors to support retrieval of references to specific versions or instances of a service. The getServiceIdentifier( ) and getServiceInterface( ) methods serve to provide descriptive information about the service for which a given service connector is designed to connect.

The profile service utilized in conjunction with the present invention supports two basic functional objects, profiles themselves and a "profile manager". The profile manager interface is alternatively referred to as the profile service interface. Any logical interfaces described are not intended to be literal. Instead, they are intended to articulate the fundamental functional operations that the service supports. All implementations of the profile service desirably support these classes of functions. In addition, individual implementations may support additional methods that are not supported in all implementations to meet the needs of a particular application.

While there have been described above the principles of the present invention in conjunction with specific implementations it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for gaining a reference to a first service by a second service in a computer system comprising:
    enabling definition of a service connector interface in conjunction with said first service;
    subsequently invoking said service connector interface in conjunction with said second service, wherein said subsequently invoking includes instantiating said service connector interface at said second service; and
    gaining reference to said first service by said second service comprising the steps of:
        retrieving a service instance at said service connector interface;
        obtaining a service reference from said first service; and
        returning said service reference obtained from said first service to said second service;
    wherein said steps of subsequently invoking said service connector interface and gaining reference to said first service are carried out by an application program operative in conjunction with said second service and wherein the service connector has no prior information regarding the first service prior to the gaining reference step, the instantiating including reading a configuration file providing an indicator for said service connector interface;
    identifying a particular instance of said first service that said second service desires to invoke and wherein a latest instance of said first service is invoked if a particular instance of said first service is not specified.

2. The method of claim 1 wherein said step of enabling definition of said service connector interface comprises the step of:

developing a computer program module adhering to said service connector interface in conjunction with said first service.

3. The method of claim 1 further comprising the step of:
specifying a particular version of said first service that said second service desires to invoke.

4. The method of claim 3 wherein a latest version of said first service is invoked if a particular version of said first service is not specified.

5. A computer program product comprising:
a computer usable medium having computer readable code embodied therein for gaining a reference to a first service in a distributed environment by a second service in a local environment in a computer system comprising:
computer readable program code devices configured to cause said computer system to effect enabling definition of a service connector interface in conjunction with said first service, the service connector interface encapsulating logic necessary to retrieve service instances in the distributed environment not in a directory service in the local environment;
computer readable program code devices configured to cause said computer system to effect subsequently invoking said service connector interface in conjunction with said second service; and
computer readable program code devices configured to cause said computer system to effect gaining reference to said first service by said second service, wherein said computer readable program code devices comprise:
computer readable program code devices configured to cause said computer system to effect retrieving a service instance at said service connector interface;
computer readable program code devices configured to cause said computer system to effect obtaining a service reference from said first service; and
computer readable program code devices configured to cause said computer system to effect returning said service reference obtained from said first service to said second service;
wherein said steps of subsequently invoking said service connector interface and gaining reference to said first service are carried out by an application program operative in conjunction with said second service and wherein the service connector interface has no prior information regarding the first service prior to the gaining reference step, instantiating, including reading a configuration file, providing an indicator for said service connector interface; identifying a particular instance of said first service that said second service desires to invoke and wherein a latest instance of said first service is invoked if a particular instance of said first service is not specified.

6. The computer program product of claim 5 wherein said computer readable program code devices configured to cause said computer system to effect enabling definition of said service connector interface comprises:
computer readable program code devices configured to cause said computer system to effect allowing for developing a computer program module adhering to said service connector interface in conjunction with said first service.

7. The computer program product of claim 5 wherein said computer readable program code devices configured to cause said computer system to effect subsequently invoking said service connector interface comprises:

computer readable program code devices configured to cause said computer system to effect instantiating said service connector at said second service.

8. The computer program product of claim 5 further comprising:
computer readable program code devices configured to cause said computer system to effect specifying a particular version of said first service that said second service desires to invoke.

9. The computer program product of claim 8 wherein a latest version of said first service is invoked if a particular version of said first service is not specified.

10. A method for gaining a reference to a first service by a second service in a computer system comprising:
providing for enabling definition of a service connector interface in conjunction with said first service;
providing for subsequently invoking said service connector interface including instantiating said service connector interface;
gaining reference to said first service by said second service comprises of: retrieving a service instance at said service connector interface; obtaining a service reference from said first service; and returning said service reference obtained from said first service to said second service; wherein said steps of subsequently invoking said service connector interface and gaining reference to said first service are carried out by an application program operative in conjunction with said second service and wherein the service connector interface has no prior information regarding the first service prior to the gaining reference step, the instantiating including reading a configuration file, providing an indicator for said service connector interface; identifying a particular instance of said first service that said second service desires to invoke and wherein a latest instance of said first service is invoked if a particular instance of said first service is not specified.

11. The method of claim 10 wherein said step of providing for enabling definition of said service connector interface comprises the step of:
providing for developing a computer program module adhering to said service connector interface in conjunction with said first service.

12. The method of claim 10 wherein said step of providing for subsequently invoking said service connector interface comprises the step of:
providing for instantiating said service connector at said second service.

13. A system for providing dynamic references between first and second services in a computer system comprising:
means for enabling definition of a service connector interface in conjunction with said first service, said definition enabling means includes means for developing a computer program module adhering to said service connector interface in conjunction with said first service;
means for subsequently invoking said service connector interface in conjunction with said second service, wherein said means for subsequently invoking said service connector interface comprises means for instantiating said service connector at said second service; and
means for gaining reference to said first service by said second service, wherein said means for gaining reference to said first service by said second service comprises:

means for retrieving a service instance at said service connector interface;

means for obtaining a service reference from said first service; and means for returning said service reference obtained from said first service to said second service; wherein said steps of subsequently invoking said service connector interface and gaining reference to said first service are carried out by an application program operative in conjunction with said second service and wherein the service connector interface has no prior information regarding the first service prior to the gaining reference step, the instantiating including reading a configuration file, providing an indicator for said service connector interface; identifying a particular instance of said first service that said second service desires to invoke and wherein a latest instance of said first service is invoked if a particular instance of said first service is not specified.

14. The system of claim 13 further comprising:

means for specifying a particular version of said first service that said second service desires to invoke.

15. The system of claim 14 wherein a latest version of said first service is invoked if a particular version of said first service is not specified.

16. A core profile engine for use in gateway or firewall servers for enabling client applications to access plug-in service modules in a distributed computing environment without embedding location and negotiation logic within the client applications, the engine comprising:

an application programming interface in communication with the client applications and adapted with interfaces for processing a request for a service provided by one of the plug-in service modules, wherein the plug-in service modules are selected from a group consisting of an authorization plug-in, an authentication plug-in, a notification plug-in, a log plug-in, a group plug-in, an entity identification factory plug-in, and a replication plug-in; and a pluggable interface attaching to the plug-in service modules, wherein the attaching includes providing an initialization parameter comprising a storage location for each of the plug-in service modules;

wherein the pluggable interface further includes a service connector associated with each of the attached plug-in service modules that is adapted to receive the service request from the application programming interface and to return a reference to the one service module providing the service based on the storage location identifying a particular instance of the one service module, wherein a latest instance of the one service module is invoked if the particular instance of the one service module is not specified.

17. A computer-implemented method for providing an application with access to a service without the use of a directory service, comprising:

reading a configuration file with the application to determine an indicator to the service;

instantiating with the application a service connector for the service based on the indicator;

requesting with the application that the service connector provide access to the service, wherein the requesting includes an identification of a version of the service for which the application is requesting access;

first operating the service connector to lookup an instance of the service;

second operating the service connector to obtain a reference to the instance of the service;

third operating the service connector to return the reference to the instance of the service to the application;

operating the application to request identification of an interface implemented by the referenced service; and operating the service connector to retrieve and return the interface identification to the application for use in utilizing the referenced service.

* * * * *